United States Patent [19]
Oshita et al.

[11] Patent Number: 6,032,467
[45] Date of Patent: Mar. 7, 2000

[54] METHOD AND APPARATUS FOR RECOVERING ENERGY FROM WASTES

[75] Inventors: Takahiro Oshita, Yokohama; Yutaka Mori, Tokyo, both of Japan

[73] Assignee: Ebara Corporation, Tokyo, Japan

[21] Appl. No.: 08/984,146

[22] Filed: Dec. 3, 1997

[30] Foreign Application Priority Data

Dec. 3, 1996 [JP] Japan .................................. 8-337463

[51] Int. Cl.[7] .................................................. F01K 25/08
[52] U.S. Cl. .............................. 60/651; 60/671; 60/39.12; 60/39.414
[58] Field of Search ............................. 60/645, 649, 651, 60/671, 39.12, 39.414

[56] References Cited

U.S. PATENT DOCUMENTS

| | | | |
|---|---|---|---|
| 4,444,007 | 4/1984 | Mitchell et al. | 60/39.12 X |
| 4,878,440 | 11/1989 | Tratz et al. | |
| 5,255,507 | 10/1993 | Gounder | 60/39.12 |
| 5,265,410 | 11/1993 | Hisatome | 60/39.12 |
| 5,509,264 | 4/1996 | Ito et al. | 60/39.12 |
| 5,771,677 | 6/1998 | Rohrer | 60/39.12 X |

FOREIGN PATENT DOCUMENTS

| | | |
|---|---|---|
| 518 842 | 5/1980 | Austria . |
| 0 334 833 | 9/1989 | European Pat. Off. . |
| 0 452 653 | 10/1991 | European Pat. Off. . |
| 0 676 464 | 10/1995 | European Pat. Off. . |
| 43 18 610 | 12/1994 | Germany . |
| 1 590 706 | 6/1985 | United Kingdom . |

Primary Examiner—Hoang Nguyen
Attorney, Agent, or Firm—Wenderoth, Lind & Ponack, L.L.P.

[57] ABSTRACT

A method and apparatus for recovering energy from wastes is used for recovering energy by gasifying wastes such as municipal waste. The method comprises gasifying wastes in a fluidized-bed gasification furnace at a relatively low temperature; introducing gaseous material and char produced in the fluidized-bed gasification furnace into a melting furnace; gasifying the gaseous material and char in the melting furnace at a relatively high temperature; introducing gas produced in the melting furnace into a heat exchanging unit; and delivering heat recovered in the heat exchanging unit to a heat cycle to generate electric energy.

6 Claims, 9 Drawing Sheets

METHOD AND APPARATUS FOR RECOVERING ENERGY FROM WASTES

BACKGROUND OF THE INVENTION

1. Field of the Invention

The present invention relates to a method and apparatus for recovering energy from wastes, and more particularly to a method and apparatus for recovering energy by gasifying wastes at a relatively low temperature and then at a relatively high temperature, and thereafter either recovering thermal energy from the generated gas to generate electric energy or combusting the generated gas to drive a gas turbine to generate electric energy and also recovering waste heat from the gas turbine to generate electric energy.

2. Description of the Prior Art

It has been customary to treat various wastes such as municipal wastes, plastic wastes, sewage sludge, industrial wastes by incineration to reduce their volume or to discard them in an untreated state to landfill sites.

In recent years, the recognition of limited availability of fossil fuels and demands for converting wastes into useful resources have increased trends toward effective utilization of energy of wastes.

Dumping the wastes in an untreated state in landfill sites has become more difficult because of scarcity of the landfill sites, and has not been allowable from the viewpoint of environmental conservation.

Therefore, an energy recovery system has lately been put to practical use, the energy recovery system having an incinerator for combusting wastes, a waste heat boiler combined with the incinerator for recovering heat from high-temperature exhaust gas ascending in the incinerator to generate steam, and a turbine that can be driven by the steam for rotating an electric generator coupled therewith to generate electric energy.

Further, there has been developed another similar energy recovery system in which heat is recovered from the waste heat boiler combined with the incinerator to generate steam, and the temperature of the generated steam is further increased by waste heat from a gas turbine for allowing the electric generator to generate electric energy with higher efficiency.

However, the above-mentioned energy recovery systems which employ an incinerator for combusting wastes suffer limitations on efforts to increase the temperature of exhaust gas and hence steam. Another problem of the conventional energy recovery systems is that generation of dioxins is unavoidable because it is impossible to decompose dioxins that are produced by the incinerator and the rate of resynthesis of dioxin at the boiler is high.

In addition, since solids such as ash generated by the incinerator contain heavy metals, those heavy metals tend to be separated out in landfill sites where the solids are finally disposed of.

In order to prevent dioxins from being generated and also heavy metals from being separated out, efforts are being made to develop a system for gasifying and melting wastes rather than incinerating wastes. The gasifying and melting system gasifies wastes at a relatively low temperature and then combusts gaseous material and char at a relatively high temperature. Since dioxins are decomposed at the high temperature, the system does not discharge dioxins. Furthermore, no heavy metals will be separated out in landfill sites because ash content is melted into slag.

In the gasifying and melting system, it is necessary to provide a process for cooling the generated gas when the gas is to be purified. In this cooling process, therefore, the thermal energy which the generated gas has is lost, and hence cannot effectively be utilized. Furthermore, no attempt has been made to use the generated gas directly as a fuel for generating electric energy.

SUMMARY OF THE INVENTION

It is therefore an object of the present invention to provide a method and apparatus for recovering energy from wastes which can effectively recover energy from wastes by gasifying wastes to generate gas, and then either recovering thermal energy from the generated gas to generate electric energy or combusting the generated gas to drive a gas turbine to generate electric energy and also recovering waste heat from the gas turbine to generate electric energy.

In order to achieve the above object, according to a first aspect of the present invention, there is provided a method for recovering energy from wastes, comprising: gasifying wastes in a fluidized-bed gasification furnace at a relatively low temperature; introducing gaseous material and char produced in the fluidized-bed gasification furnace into a melting furnace; gasifying the gaseous material and char in the melting furnace at a relatively high temperature; introducing gas produced in the melting furnace into a heat exchanging unit; and delivering heat recovered in the heat exchanging unit to a heat cycle to generate electric energy.

According to a second aspect of the present invention, there is also provided a method for recovering energy from wastes, comprising: gasifying wastes in a fluidized-bed gasification furnace at a relatively low temperature; introducing gaseous material and char produced in the fluidized-bed gasification furnace into a melting furnace; gasifying the gaseous material and char in the melting furnace at a relatively high temperature; introducing gas produced in the melting furnace into a gas turbine and combusting the gas to generate electric energy; and recovering waste heat from the gas turbine and delivering the recovered heat to a heat cycle to generate electric energy.

According to a third aspect of the present invention, there is provided an apparatus for recovering energy from wastes, comprising: a fluidized-bed gasification furnace for gasifying wastes at a relatively low temperature to produce gaseous material and char; a melting furnace for producing gas from said gaseous material and said char at a relatively high temperature; a heat exchanging unit for recovering heat from said gas produced in said melting furnace; and a heat cycle for generating electric energy from said heat recovered by said heat exchanging unit.

According to a fourth aspect of the present invention, there is provided an apparatus for recovering energy from wastes, comprising: a fluidized-bed gasification furnace for gasifying wastes at a relatively low temperature to produce gaseous material and char; a melting furnace for producing gas from said gaseous material and said char at a relatively high temperature; a gas turbine for combusting said gas produced in said melting furnace and generating electric energy; and a heat cycle for generating electric energy from waste heat recovered from said gas turbine.

The fluidized-bed gasification furnace may comprise an internally circulating fluidized-bed gasification furnace, and the melting furnace may comprise a swirling-type melting furnace. It is preferable to employ the internally circulating fluidized-bed gasification furnace and the swirling-type melting furnace in combination. The internal temperature of the fluidized-bed gasification furnace is preferably in the range of 450 to 800° C., and the temperature of the fluidized bed is preferably in the range of 450 to 650° C. The internal temperature of the melting furnace is preferably at 1300° C. or higher.

The fluidizing gas supplied to the fluidized-bed gasification furnace for gasifying the wastes is selected from air, oxygen enriched air, a mixture of air and steam, a mixture of oxygen enriched air and steam, and a mixture of oxygen and steam. As a fluidized medium, sand such as silica sand or Olivine sand, alumina, iron powder, limestone, dolomite, or the like may be used.

The gas introduced into the melting furnace for gasification may be selected from oxygen enriched air and oxygen. The total amount of oxygen supplied to the fluidized-bed gasification furnace and the melting furnace for gasification may be in the range of 0.1 to 0.6 of the theoretical amount of oxygen for combustion of the wastes. The amount of oxygen supplied to the fluidized-bed gasification furnace may be in the range of 0.1 to 0.3 of the theoretical amount of oxygen for combustion of the wastes.

The fluidized-bed gasification furnace comprises a fluidized bed and a freeboard, and the fluidized bed is kept at a temperature ranging from 450 to 650° C. and the freeboard is kept at a temperature ranging from 600 to 800° C. The swirling-type melting furnace comprises a combustion chamber and a slag separation chamber. The gaseous material and char form the fluidized-bed gasification furnace form a swirling flow together with the supplied gas in the combustion chamber, and are gasified at a relatively high temperature, and ash content is melted and separated as slag in the slag separation chamber.

The fluidized-bed gasification furnace which can be used in the present invention may be a known atmospheric or pressurized bubbling-type fluidized-bed furnace, in consideration of characteristics of wastes to be treated. However, it is particularly preferable to use an internally circulating fluidized-bed gasification furnace which has been developed by the inventors of the present invention.

The internally circulating fluidized-bed gasification furnace preferably has a circular horizontal cross-section, and has a relatively mild fluidized-bed with a substantially low fluidizing gas rate in a central region and a relatively intensive fluidized-bed with a substantially high fluidizing gas rate in a peripheral region. The internally circulating fluidized-bed gasification furnace has an inclined wall installed along an inner wall in the vicinity of the surface of the fluidized-bed, for deflecting the flow of the fluidized medium from the peripheral region toward the central region so that a revolving flow of the fluidized medium is formed in such a manner that the fluidized medium descends in the mild fluidized-bed, ascends in the intense fluidized-bed, moves from the central region toward the peripheral region in a lower portion of the fluidized-bed and moves from the peripheral region toward the central region in an upper portion of the fluidized-bed.

In the melting furnace, the gaseous material and char introduced from the fluidized-bed gasification furnace are brought into contact with the gasifying gas, and are completely gasified at a temperature of 1300° C. or higher, and ash content therein is discharged as molten slag from the bottom of the melting furnace.

The melting furnace may be of the self-combustion type in which the slag and the produced gas flow downwards.

The melting furnace may comprise a Texaco furnace in which coal water mixture is blown therein only from an upper part of the furnace, but may preferably comprise a swirling-type melting furnace. In the swirling-type melting furnace, gaseous material and char are gasified at a relatively high temperature while forming a swirling flow with supplied gas, ash content is melted, and then resultant molten slag is separated and discharged therefrom.

By using the swirling-type melting furnace, high load and high speed combustion can be performed, distribution of the residence time of gas becomes narrow, a carbon conversion percentage and a slag mist collecting efficiency are high, and the combustor can be of compact size.

The gas introduced into the melting furnace for gasification may be selected from oxygen enriched air and oxygen. The total amount of oxygen supplied to the fluidized-bed gasification furnace and the melting furnace for gasification may be in the range of 0.1 to 0.6 of the theoretical amount of oxygen for combustion of the wastes.

Since ash content in char which is introduced into the subsequent melting furnace from the fluidized-bed gasification furnace is converted into molten slag in the melting furnace, harmful metals are sealed in the slag and will not be eluted out. Dioxins and precursors thereof, and PCB (polychlorinated biphenyl) are fully decomposed by the high-temperature combustion in the melting furnace.

The gas generated in the melting furnace is introduced into the heat exchanging unit where heat is recovered. The recovered heat is delivered to the heat cycle for generating electric energy with the electric generator.

The gas generated in the melting furnace may be introduced into the gas turbine and combusted to drive the gas turbine for generating electric energy with the electric generator. In order to reduce variations in the amount of the gas supplied to the gas turbine due to changes in the amount and quality of the wastes, an auxiliary fuel such as coal may be added to the process of gasifying the wastes. Waste heat from the gas turbine is recovered and delivered to the heat cycle for generating electric energy.

The heat cycle preferably has a multicomponent mixture composed of at least two components having different boiling points. Preferably, at least one of the components has a boiling point lower than the boiling point of water. For example, the multicomponent mixture may be a mixture of water and ammonia. The ratio between the components is determined depending on operating conditions of the heat cycle, and may vary in the heat cycle.

According to one aspect of the present invention, the heat exchanging unit may comprise a heat exchanger disposed in a slag separation chamber defined in the melting furnace and storing a cooling medium therein, or a heat exchanger connected to slag separation chamber defined in the melting furnace and supplied with a cooling medium from the slag separation chamber. The cooling medium is preferably water. The slag separation chamber may comprise slag granulation chamber.

When the molten slag and the gas are introduced into the slag separation chamber, the slag is cooled and solidified by the cooling medium in the slag separation chamber, and the gas is either reversed by the surface of the cooling medium and discharged out of the melting furnace or is introduced, together with the molten slag, into the cooling medium. The gas which enters the cooling medium is then cooled and scrubbed by the cooling medium, and discharged out of the melting furnace. If the gas is introduced into the cooling medium, a small amount of slag mist and unburned carbon contained in the gas can be trapped by the cooling medium. Heretofore, the heat of the cooling medium has been discharged out of the melting furnace without recovery. According to the present invention, however, the heat of the cooling medium is recovered for electric energy generation.

According to another aspect of the present invention, the heat exchanging unit comprise a heat exchanger provided at the downstream side of the melting furnace. The heat exchanger comprises a convection boiler or a waste heat boiler. The waste heat from the gas turbine is recovered by the waste heat boiler connected to the heat cycle, and heat of the gas from the melting furnace is recovered by the heat exchanger and delivered to the heat cycle.

Each of the fluidized-bed gasification furnace and the melting furnace may be operated at atmospheric pressure or under increased pressure.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A method and apparatus for recovering energy from wastes according to the present invention will be described below with reference to the drawings.

Like or corresponding parts are denoted by like or corresponding reference characters throughout the drawings.

Figure 1:
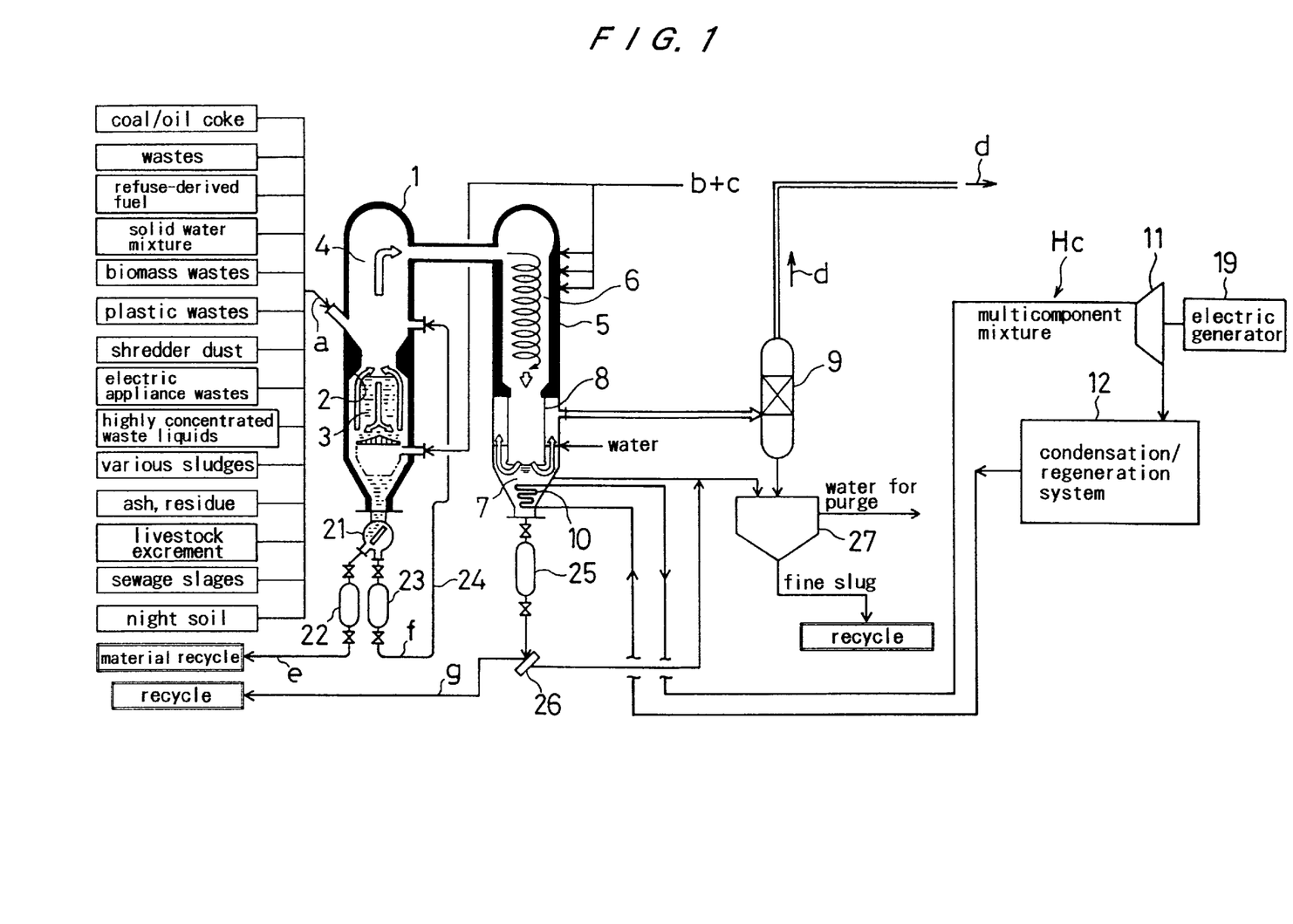
FIG. 1 is a schematic diagram of an energy recovery system for carrying out an energy recovery method according to a first embodiment of the present invention.

FIG. 1 shows an energy recovery system for carrying out an energy recovery method according to a first embodiment of the present invention.

As shown in FIG. 1, wastes which are used in the present invention may be municipal wastes, refuse-derived fuel (RDF), solid-water mixture (SWM), biomass wastes, plastic wastes including fiber-reinforced plastics (FRP), automobile wastes (shredder dust, waste tires), electric appliance wastes, special wastes (medical waste, etc.), sewage sludges, night soil, highly concentrated waste liquids, industrial sludges, which have widely different calorific values, moisture contents, and shapes. These wastes may be used in combination. Low-grade coal may be used with these wastes.

Refuse-derived fuel (RDF) is produced by crushing and classifying municipal wastes, adding quicklime to the classified municipal wastes, and compacting them to shape. Solid-water mixture (SWM) is produced by crushing municipal wastes, converting them into a slurry with water, and converting the slurry under a high pressure into an oily fuel by hydrothermal reaction. Low-grade coal may be brown coal, lignite and peat which have low degrees of coalification, or coal refuse which is produced upon coal separation.

These wastes are first supplied into a fluidized-bed reactor, and pyrolized therein. Particularly, by employing an internally circulating fluidized-bed gasification furnace, the wastes which have been crushed to not minute but small lumps by pretreatment can be supplied to the fluidized-bed gasification furnace. The reason is that by an intense revolving flow of the fluidizing medium, good heat transfer to the supplied wastes can be obtained, and large-sized incombustibles can be discharged from the fluidized-bed furnace. Therefore, among these wastes, municipal wastes, biomass wastes, plastic wastes, and automobile wastes are roughly crushed to a size of about 30 cm. Sewage sludges and night soil which have a high moisture content are dehydrated into a cake by a centrifugal separator or the like in dedicated treatment facilities, and then the cake is transported to a plant site which has a treating system of the present invention. Refuse-derived fuel, solid water mixture, and highly concentrated waste liquids are used as they are. Coal added for calorie adjustment may be used as it is, if it is crushed to a size of 40 mm or less.

The above wastes may be roughly grouped into high calorific wastes and low calorific wastes according to their own calorie content and their moisture content. Generally, municipal wastes, refuse-derived fuel, solid water mixture, plastic wastes, automobile wastes, and electric appliance wastes are high calorific wastes. Biomass wastes, special wastes such as medical wastes, dehydrated cake of sewage sludges and night soil, and highly concentrated waste liquids are low calorific wastes.

These wastes are charged into a high calorific waste pit, low calorific waste pit, and a tank, and sufficiently stirred and mixed in the pits and the tank. Thereafter, they are supplied to the fluidized-bed gasification furnace. Metals contained in the wastes which are supplied to the fluidized-bed gasification furnace are recovered in a non-oxidized condition if their melting points are higher than the temperature of a fluidized-bed in the fluidized-bed gasification furnace. Therefore, these recovered metals can be used as ingot metal in accordance with the particular type of metal.

If the wastes supplied to the fluidized-bed gasification furnace have constant quality, the ratio of the wastes to the gas supplied to the fluidized-bed gasification furnace is also constant. However, if the proportion of the low calorific wastes in the supplied wastes increases or the overall moisture content in the supplied wastes increases, the temperature of the fluidized-bed tends to go down from a set value. When the temperature of the fluidized-bed goes down, it is desirable to control proportion of low calorific wastes to the high calorific wastes in the supplied wastes to keep the calorific value of the supplied wastes constant from the viewpoint of the gas utilization facility at a later stage. Alternatively, high-grade coal may be added to adjust the calorific value of the supplied wastes.

The energy recovery system shown in FIG. 1 generally comprises a fluidized-bed gasification furnace 1 and a swirling-type melting furnace 5.

The fluidized-bed gasification furnace 1 comprises an internally circulating fluidized-bed gasification furnace. The internally circulating fluidized-bed gasification furnace preferably has a circular horizontal cross-section, and has a fluidized-bed 3 including a relatively mild fluidized-bed with a substantially low fluidizing gas rate in a central region and a relatively intensive fluidized-bed with a substantially high fluidizing gas rate in a peripheral region by being supplied with a fluidizing gas from a diffusion plate at the bottom of the furnace. The internally circulating fluidized-bed gasification furnace 1 has an inclined wall 2 installed along an inner wall in the vicinity of the surface of the fluidized-bed, for deflecting the flow of the fluidized medium from the peripheral region toward the central region so that a revolving flow of the fluidized medium is formed in such a manner that the fluidized medium descends in the mild fluidized-bed, ascends in the intense fluidized-bed, moves from the central region toward the peripheral region in a lower portion of the fluidized-bed and moves from the peripheral region toward the central region in an upper portion of the fluidized-bed.

The internally circulating fluidized-bed gasification furnace 1 has a freeboard 4 disposed above the fluidized bed 3. By supplying oxygen containing gas such as substantially pure oxygen or oxygen enriched air to the freeboard, the load in the subsequent melting furnace can be reduced, and gasification of tar and char in the generated gas can be accelerated in the freeboard.

Figure 3:
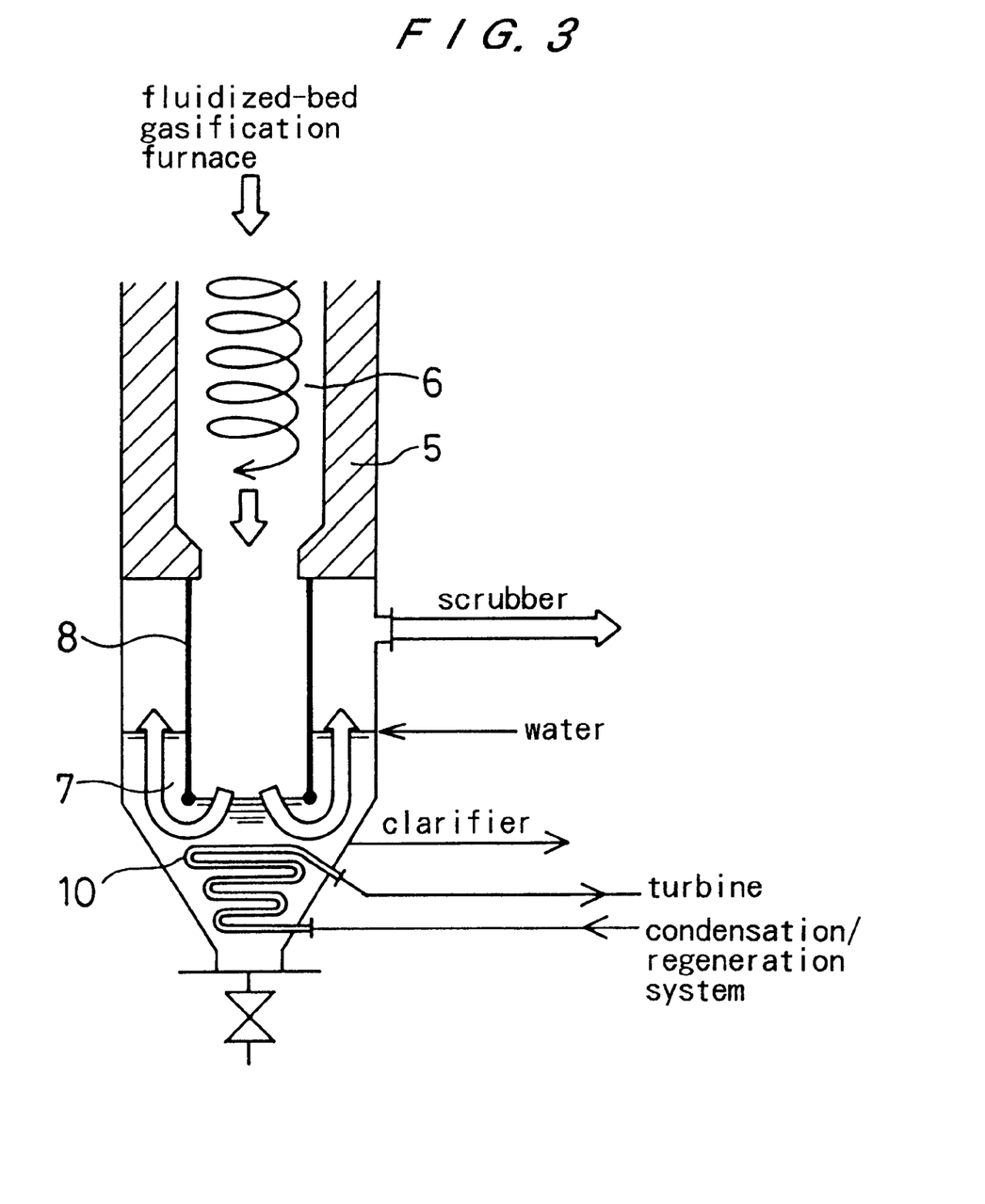
FIG. 3 is an enlarged fragmentary vertical cross-sectional view of a swirling-type melting furnace in the energy recovery systems shown in FIGS. 1 and 2.

As shown in FIGS. 1 and 3, the swirling-type melting furnace 5 has a cylindrical combustion chamber 6, a slag separation chamber 7 disposed below the combustion chamber 6, and a guide pipe 8 extending vertically from the combustion chamber 6 into the slag separation chamber 7. The slag separation chamber 7 stores therein water as a cooling medium. Gaseous material and char which have been generated in the fluidized-bed gasification furnace 1 are supplied to the swirling-type melting furnace 5, and form a swirling flow together with the gasifying gas supplied to the melting furnace 5 in the combustion chamber 6. In the combustion chamber 6, the gaseous material and char are gasified at a relatively high temperature, and ash content contained therein is melted. The melted ash is delivered through the guide tube 8 into the slag separation chamber 7, and separated as slag in the slag separation chamber 7, and then discharged from the bottom of the swirling-type melting furnace 5.

Waste "a" which has been uniformly mixed is supplied at a constant rate through a screw feeder or the like into the fluidized-bed gasification furnace 1. A mixture of oxygen "b" and steam "c" is supplied as a gas for gasifying and fluidizing the waste "a" into the fluidized-bed gasification furnace 1 from a bottom portion thereof. The waste "a" falls into the fluidized bed 3 in the fluidized-bed gasification furnace 1, and is brought into contact with the gasifying and fluidizing gas in the fluidized bed 3 which is kept at a temperature ranging from 450 to 650° C. The waste "a" is rapidly pyrolyzed and gasified in the fluidized bed 3 to thus produce gas, tar, carbonous material, and $H_2O$. The carbonous material is crushed into char by a stirring action of the fluidized bed 3.

Silica sand, which is a fluidized medium, and incombustibles are discharged from the bottom of the fluidized-bed gasification furnace 1 and supplied to a screen 21 by which the incombustibles "e" are separated. The separated incombustibles "e" contain valuable metals and are discharged through a lock hopper 22 for material recycling. The silica sand "f" is carried through a lock hopper 23 and a fluidized medium circulation path 24 and charged back into the fluidized-bed gasification furnace 1 from an upper end thereof.

The gas, tar, char and $H_2O$ that are generated in the fluidized-bed gasification furnace 1 are then supplied altogether into the combustion chamber 6 of the swirling-type melting furnace 5, in which they are mixed with oxygen "b" for gasification in a swirling flow thereof and rapidly oxidized at a temperature of 1300° C. or higher. Thus, ash content in the char is converted into slag mist which is trapped by slag phase on an inner wall of the melting furnace 5 under the centrifugal forces of the swirling flow. The trapped slag mist then flows down on the inner wall and enters the slag separation chamber 7, and then slag is discharged from a bottom of the slag separation chamber 7 to the outside of the melting furnace 5. The oxidizing reaction at the relatively high temperature is completed in the combustion chamber 6, producing gas which comprises $H_2$, CO, $CO_2$ and $H_2O$ and the like.

The generated gas is introduced through the guide pipe 8 into the water stored as a cooling medium in the slag separation chamber 7. Therefore, the temperature of the generated gas is lowered, and most of slag mist and unburned carbon contained in the gas are trapped as slag in the slag separation chamber 7. The trapped slag "g" is then discharged from the bottom of the slag separation chamber 7, and delivered through a lock hopper 25 and a screen 26 for recycling.

The generated gas is cleaned as it passes through the water in the slag separation chamber 7, and is then discharged from the swirling-type melting furnace 5 and enters a scrubber 9. In the scrubber 9, the generated gas is cooled and scrubbed to remove dust and HCl, thus generating a refined gas. The refined gas is discharged from the scrubber 9, and will be used as a synthesized gas "d" which is mainly composed of CO and $H_2$.

The bottom of the scrubber 9 and the slag separation chamber 7 are connected to a clarifier 27.

As shown in FIGS. 1 and 3, a steam generator 10 which serves as a heat exchanging unit is disposed in the slag separation chamber 7 of the swirling-type melting furnace 5. The generated gas in the swirling-type melting furnace 5 has a high temperature of about 1300° C. As described above, the generated gas passes through the water (quenching water) stored in the slag separation chamber 7 that is defined in a lower portion of the swirling-type melting furnace 5 for purifying the generated gas. When the gas passes through the quenching water, the water is heated by the gas. After the gas has passed through the quenching water, the temperature of the gas drops to about 250° C. Therefore, most of the thermal energy of the generated gas is consumed to change the sensible heat and latent heat of the water. The heat that is transferred from the generated gas to the water is recovered by the steam generator 10.

Specifically, the energy recovery system employs a heat cycle that uses, as a working fluid, a multicomponent mixture containing a component having a low boiling point for recovering the heat from the quenching water and hence the generated gas through the steam generator 10, so that the thermal efficiency of the energy recovery system will be improved.

If a mixture of ammonia and water is used as the multicomponent mixture in the heat cycle, then the steam generator 10 can generate steam at a temperature of about 70° C. when the ammonia has a concentration of 80 weight % and is kept under a pressure of 25 kg/cm²abs. The steam generated by the heat cycle has a pressure high enough to lend itself to the generation of electric energy, and is eventually led to a turbine coupled to an electric generator for thereby generating electric energy. The heat system includes a condensation/regeneration system connected to a discharge port of the turbine for effecting a heat exchange and changing the concentration of the working fluid in order to utilize the thermal energy supplied to the heat cycle as much as possible.

Figure 4:
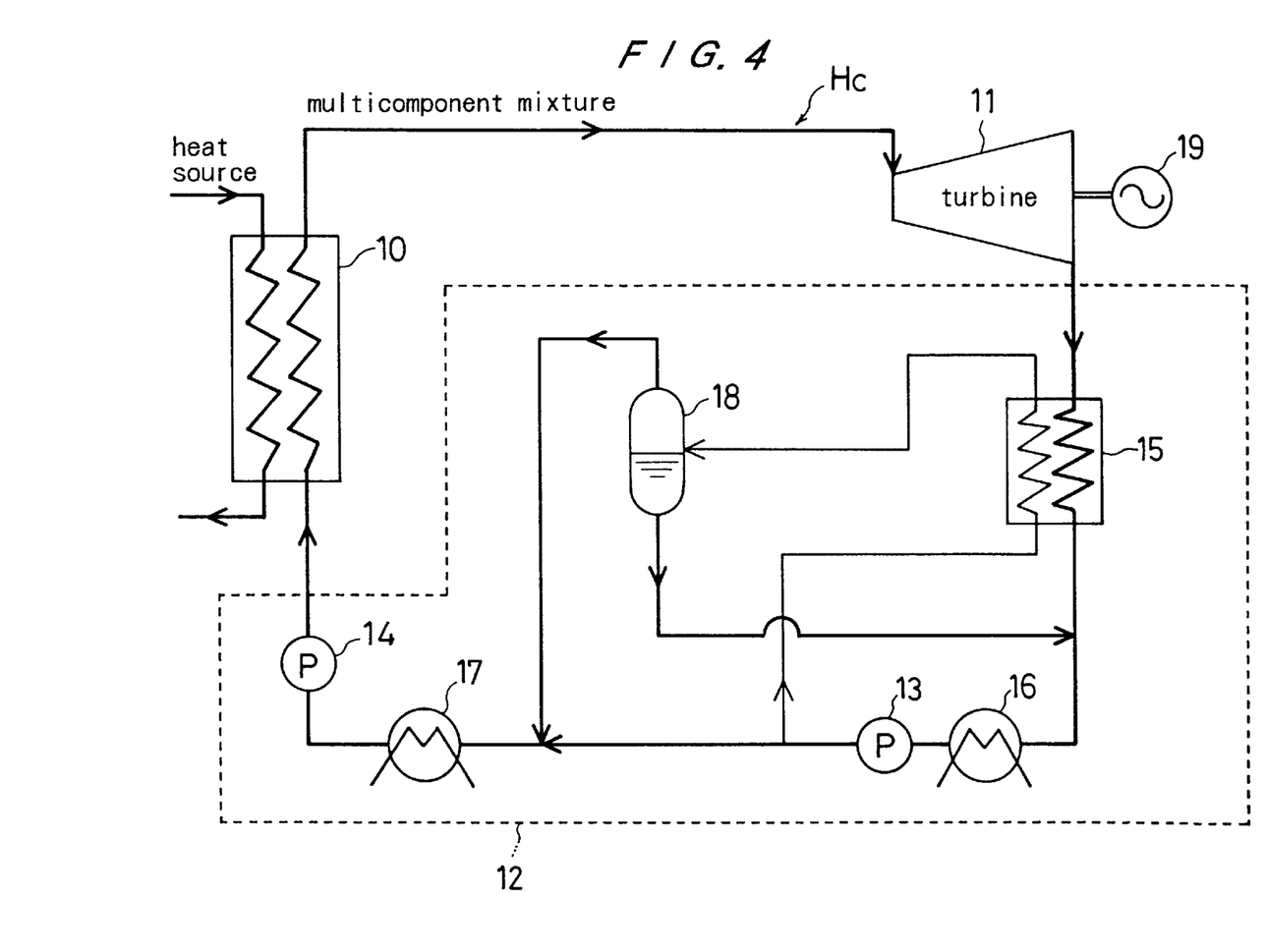
FIG. 4 is a diagram illustrating a heat cycle of a multi-component mixture which is used in the energy recovery method.

As shown in FIGS. 1 and 4, the heat cycle, generally indicated by Hc, comprises the steam generator 10 in the slag separation chamber 7 of the melting furnace 5, a turbine 11 for driving an electric generator 19, and a condensation/regeneration system 12. As shown in FIG. 4, the condensation/regeneration system 12 comprises a pair of pumps 13, 14, a heat exchanger 15 such as a regenerator, a pair of condensers 16, 17, and a separator 18 for changing the concentration of the working fluid.

Figure 2:
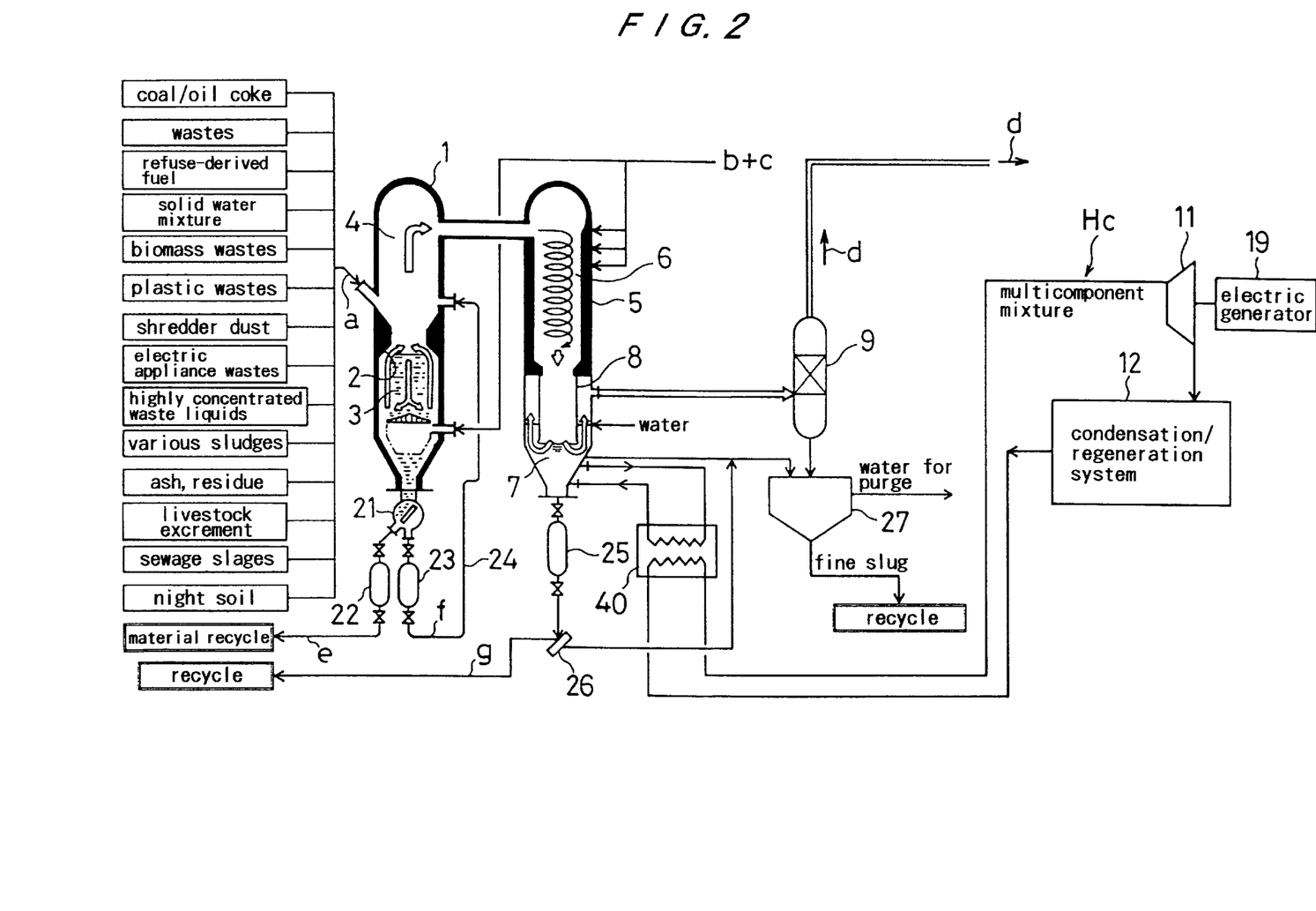
FIG. 2 is a schematic diagram of a modified embodiment of the energy recovery system shown in FIG. 1.

In the energy recovery system shown in FIG. 1, the steam generator 10 is disposed in the slag separation chamber 7. In a modified energy recovery system shown in FIG. 2, the steam generator is replaced with a heat exchanger 40 disposed outside of and connected to the slag separation chamber 7 for exchanging heat with the quenching water that is discharged from the slag separation chamber 7. The heat exchanger 40 is part of the heat cycle.

Figure 5:
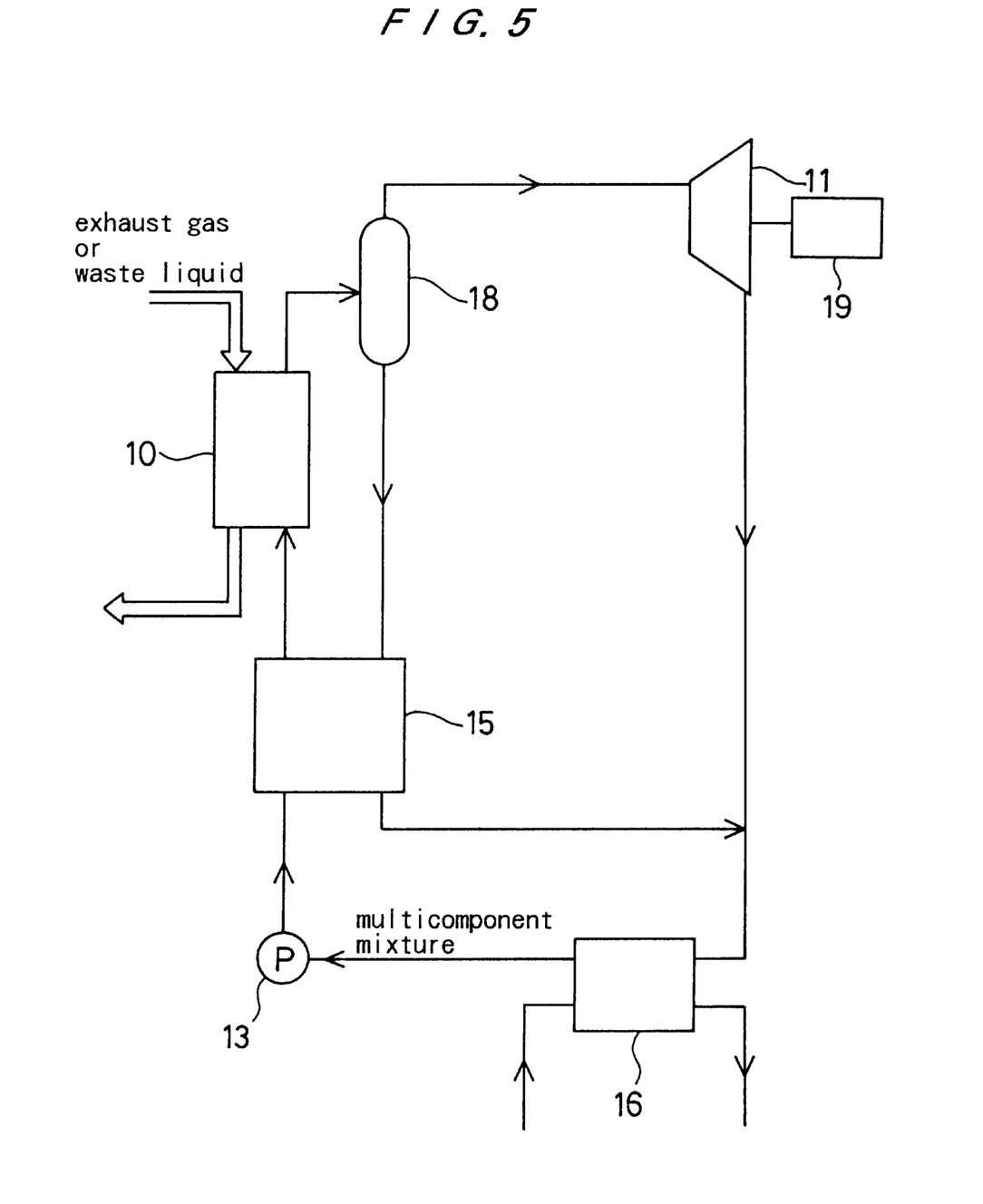
FIG. 5 is a diagram illustrating another heat cycle of a multicomponent mixture.

FIG. 5 shows another heat cycle which has a steam generator 10, a turbine 11 coupled to an electric generator 19, a pump 13, a heat exchanger 15, a condenser 16, and a separator 18.

Figure 6:
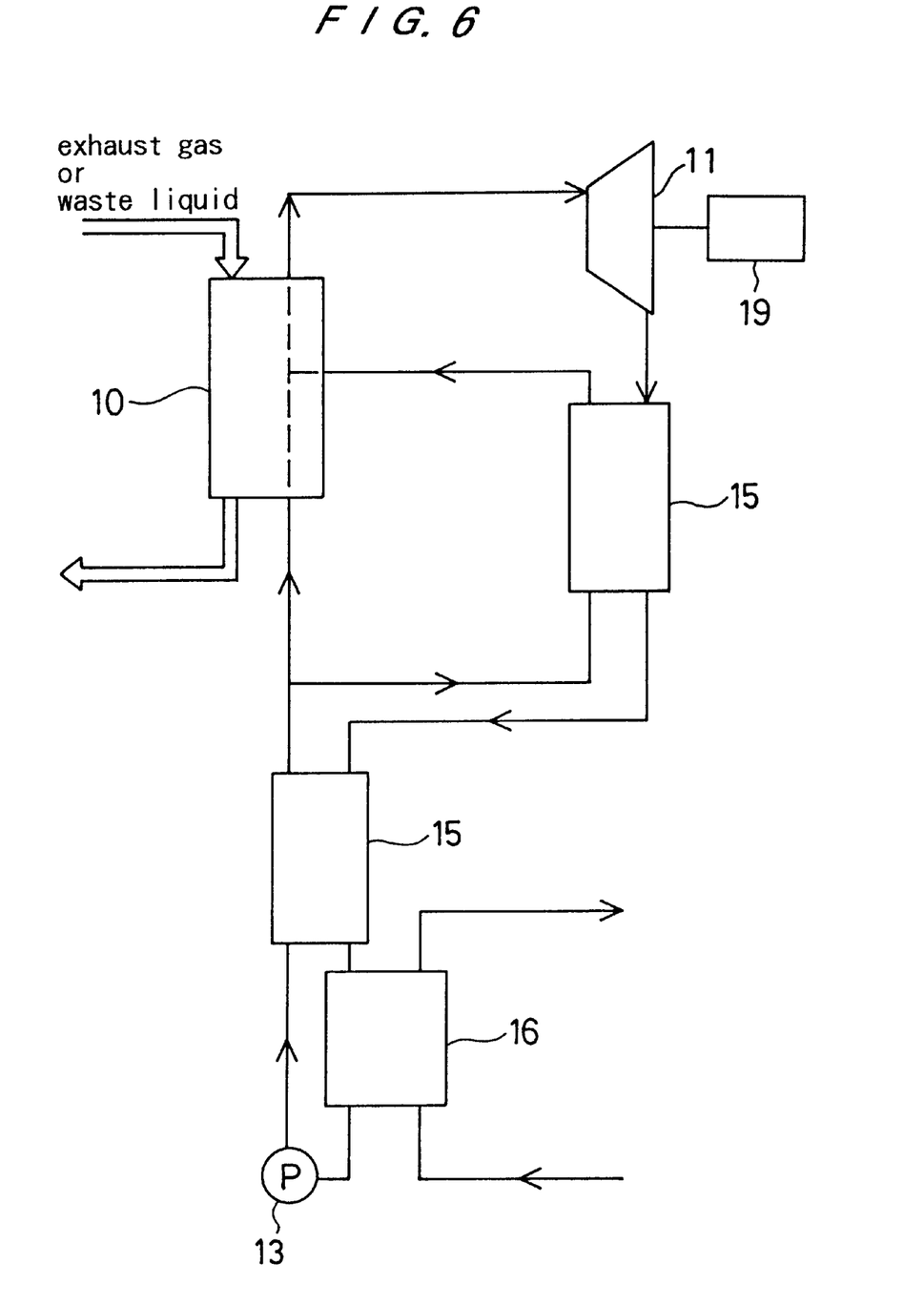
FIG. 6 is a diagram illustrating still another heat cycle of a multicomponent mixture.

FIG. 6 shows still another heat cycle which has a steam generator 10, a turbine 11 coupled to an electric generator 19, a pump 13, a pair of heat exchangers 15, and a condenser 16.

The heat cycle Hc shown in FIG. 4 operates as follows: The multicomponent mixture which contains a component having a relatively low boiling point in high concentration enters the steam generator 10, and is converted into a steam mixture by the heat of a heat source, i.e., the water in the slag separation chamber 7. The mixture steam flows from the steam generator 10 to the turbine 11, where it expands and rotates the turbine 11 and hence the electric generator 19 to generate electric energy. The fluid discharged from the turbine 11 enters the heat exchanger 15. In the heat exchanger 15, the heat of the fluid is used to heat a part of a multicomponent mixture having a medium concentration that has been condensed by the condenser 16, which is a low-pressure condenser, and hence the temperature of the fluid is lowered. The fluid from the heat exchanger 15 is thinned with a multicomponent mixture which contains a component having a low boiling point in low concentration, and then enters the condenser 16. The multicomponent mixture having a medium concentration and discharged from the condenser 16 is delivered by the pump 13, and divided into two flows. One of the flows passes through the heat exchanger 15 into the separator 18, which separates the multicomponent mixture into a multicomponent steam mixture having a high concentration and a multicomponent liquid mixture having a low concentration. The multicomponent liquid mixture having the low concentration is used to thin the fluid discharged from the heat exchanger 15. The multicomponent steam mixture having the high concentration is mixed with the other flow supplied from the pump 13, i.e., the multicomponent mixture having the medium condensation to make a fluid mixture high a high concentration at the upstream side of the condenser 17. The fluid mixture is condensed by the condenser 17 which is a high-pressure condenser, and then delivered by the pump 14 into the steam generator 10.

The heat cycle Hc uses as its working fluid a multicomponent mixture which comprises at least two components having different boiling points. At least one of the components is a material whose boiling point is lower than the boiling point of water.

The working fluid has the following properties that are effective for use in combination with the turbine generator:
  (a) The working fluid has a low boiling point.
  (b) The working fluid has a boiling point and a melting point which are different from each other (the working fluid evaporates and condenses non-isothermally).
  (c) The condensing pressure of the working fluid varies as its concentration varies.

The above properties of the working fluid offer the following advantages which make the heat cycle Hc highly efficient in various portions of the heat cycle:
  (1) Since the working fluid having a low boiling point is supplied to the steam generator, the steam generator can generate steam even at low temperatures and hence can use a heat source of low temperature.
  (2) Inasmuch as the working fluid evaporates while its temperature rises, the temperature difference between the working fluid and the heat source is smaller than that of the conventional steam cycle, and the thermal energy from the heat source can be recovered more effectively.
  (3) The fluid discharged from the turbine 11 is condensed while its temperature decreases. Therefore, when a working fluid that is condensed by the condenser 16 and has a temperature lower than the fluid discharged from the turbine 11 is supplied to the heat exchanger 15, the working fluid supplied to the heat exchanger 15 can recover the heat from the fluid discharged from the turbine 11. As a result, since the amount of heat discharged out of the heat cycle Hc through the condenser 16 is relatively small, the amount of electric energy generated by the turbine generator 11, 19 is relatively large.
  (4) Depending on the temperature of the heat source and the scale of power generation, the working fluid discharged from the turbine may be made of low concentration and then condensed for thereby lowering the pressure of the working fluid discharged from the turbine. Consequently, a heat drop in the turbine may be increased, thus enabling the electric generator to produce an increased output of electric energy.

The numbers of the steam generator, the heat exchanger, the separator, the pump, the condenser, the turbine, and the electric generator may be greater than those illustrated in FIG. 4, and some of these elements may be dispensed with. In some cases, more regenerators (heat exchangers) may be added. In FIG. 4, although the concentration of the multicomponent mixture has been described as being varied, it may be of a constant value.

Figure 7:
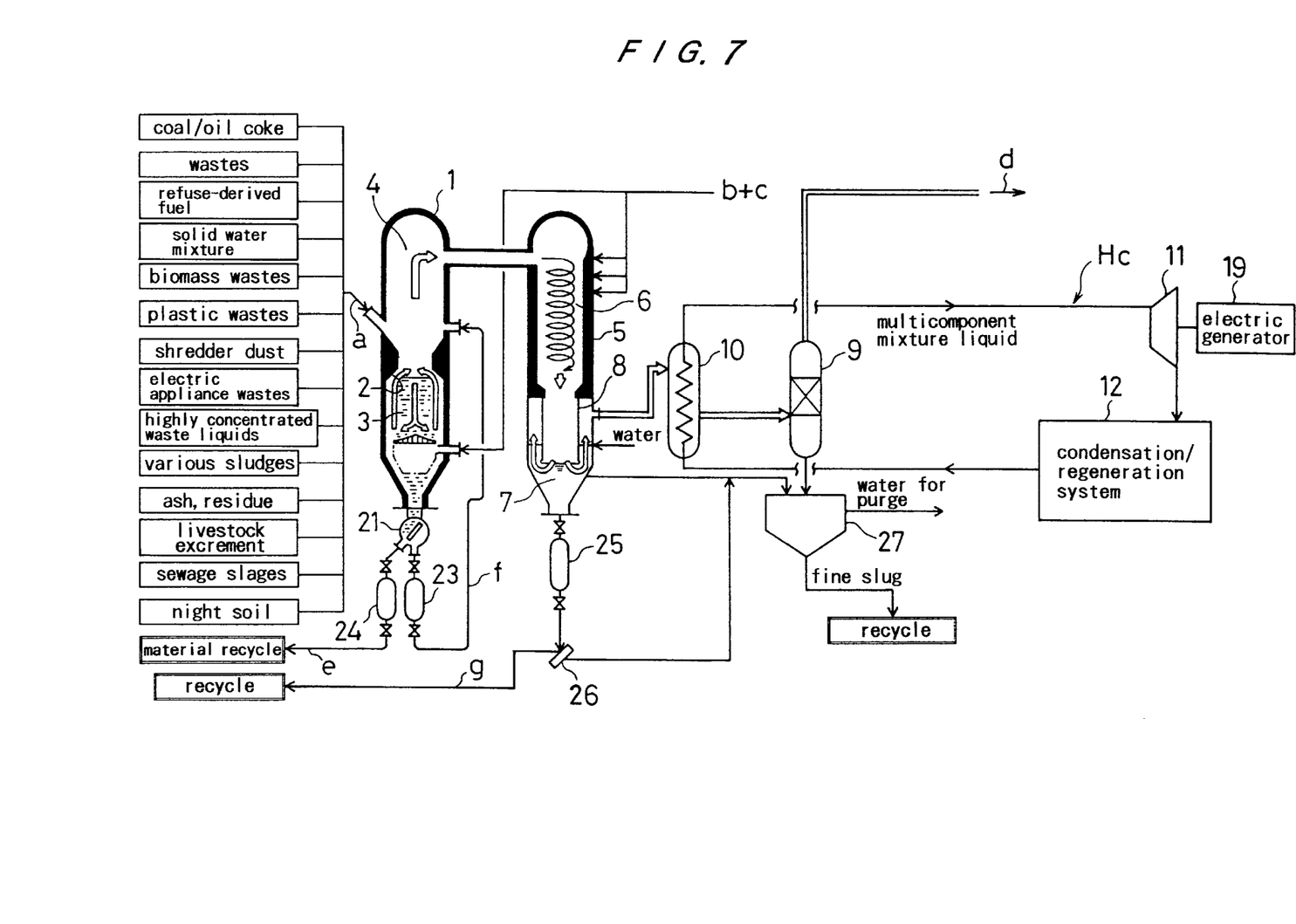
FIG. 7 is a schematic diagram of an energy recovery system for carrying out an energy recovery method according to a second embodiment of the present invention.

FIG. 7 shows an energy recovery system for carrying out an energy recovery method according to a second embodiment of the present invention. The energy recovery system shown in FIG. 7 differs from the energy recovery system shown in FIG. 1 in that a heat cycle Hc has a steam generator 10 positioned between the swirling-type melting furnace 5 and the scrubber 9. The fluidized-bed gasification furnace 1 and the swirling-type melting furnace 5 are identical to those shown in FIG. 1, and the heat cycle Hc is essentially the same as the heat cycle shown in FIGS. 1 and 4.

In the second embodiment, a saturated gas having a temperature of about 250° C. is supplied from the swirling-type melting furnace 5 to the steam generator 10. The steam generator 10 is also supplied with a multicomponent mixture which contains a component having a relatively low boiling point for producing steam that is introduced into the turbine 11 to drive the electric generator 10 for thereby generating electric energy.

Figure 8:
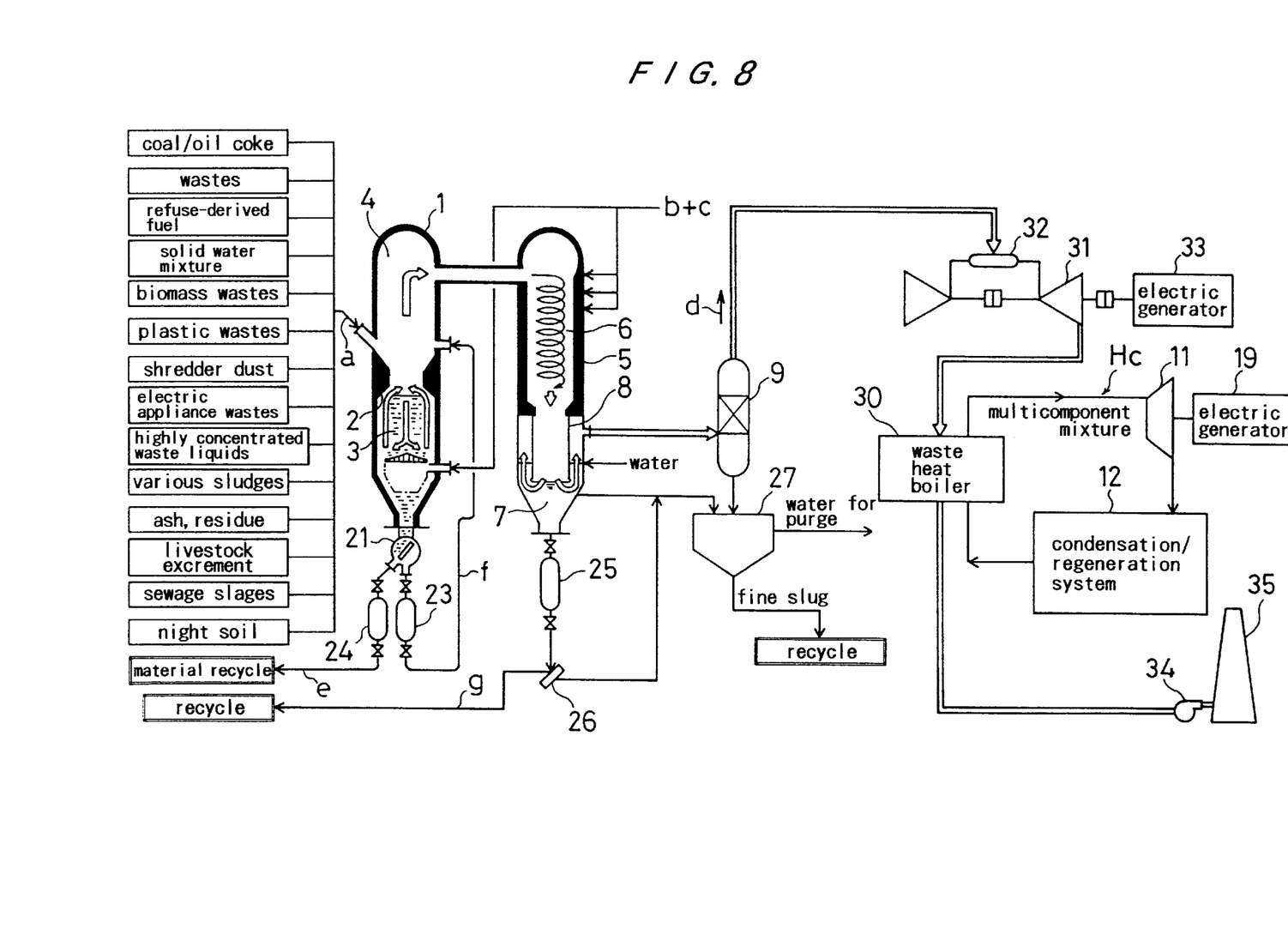
FIG. 8 is a schematic diagram of an energy recovery system for carrying out an energy recovery method according to a third embodiment of the present invention.

FIG. 8 shows an energy recovery system for carrying out an energy recovery method according to a third embodiment of the present invention. The energy recovery system shown in FIG. 8 differs from the energy recovery system shown in FIG. 1 in that it does not employ a steam generator, but has a gas turbine which uses, as a fuel thereof, a gas produced by the swirling-type melting furnace 5 and purified, for generating electric energy with a combined cycle power generation system. The gas discharged from the melting furnace 5 can be used as a gas turbine fuel because it is rich with CO and $H_2$. The fluidized-bed gasification furnace 1 and the swirling-type melting furnace 5 are identical to those shown in FIG. 1, and the heat cycle Hc is essentially the same as the heat cycle shown in FIGS. 1 and 4.

The combined cycle power generation system usually has a waste heat boiler for recovering heat of a gas discharged from the gas turbine to produce steam for generating electric energy. In the combined cycle power generation system according to this embodiment, the waste heat boiler is supplied with a multicomponent mixture which includes a component having a relatively low boiling point for generating steam which is introduced into a turbine coupled to an electric generator to generate electric energy. While the gas discharged from the gas turbine is a heat source having a relatively low temperature, i.e., ranging from 500 to 600° C., the combined cycle power generation system according to this embodiment employs a heat cycle which uses the multicomponent mixture for generating an amount of electric energy which is about 20% greater than with the conventional Rankine cycle. Therefore, the overall energy recovery system has an improved thermal efficiency.

As shown in FIG. 8, the gas discharged from the swirling-type melting furnace 5 enters a combustion chamber 32 of a gas turbine 31. The gas is used as a fuel and combusted in the combustion chamber 32, thus producing a combustion gas that is used to drive the gas turbine 31. When the gas turbine 31 is driven, an electric generator 33 coupled to the gas turbine 31 is driven to generate electric energy. The gas discharged from the gas turbine 31 passes through a waste heat boiler 30, thereby imparting heat to the heat cycle Hc, and then is delivered from an induction fan 34 to a smoke stack 35, from which the gas is discharged into the atmosphere. In the heat cycle, the heat recovered from the discharged gas through the waste heat boiler 30 is used to generate steam. The steam may comprise a single component steam or a mixed components steam. The steam is led to the turbine 11 to rotate the electric generator 19 coupled to the turbine 11 for generating electric energy.

Figure 9:
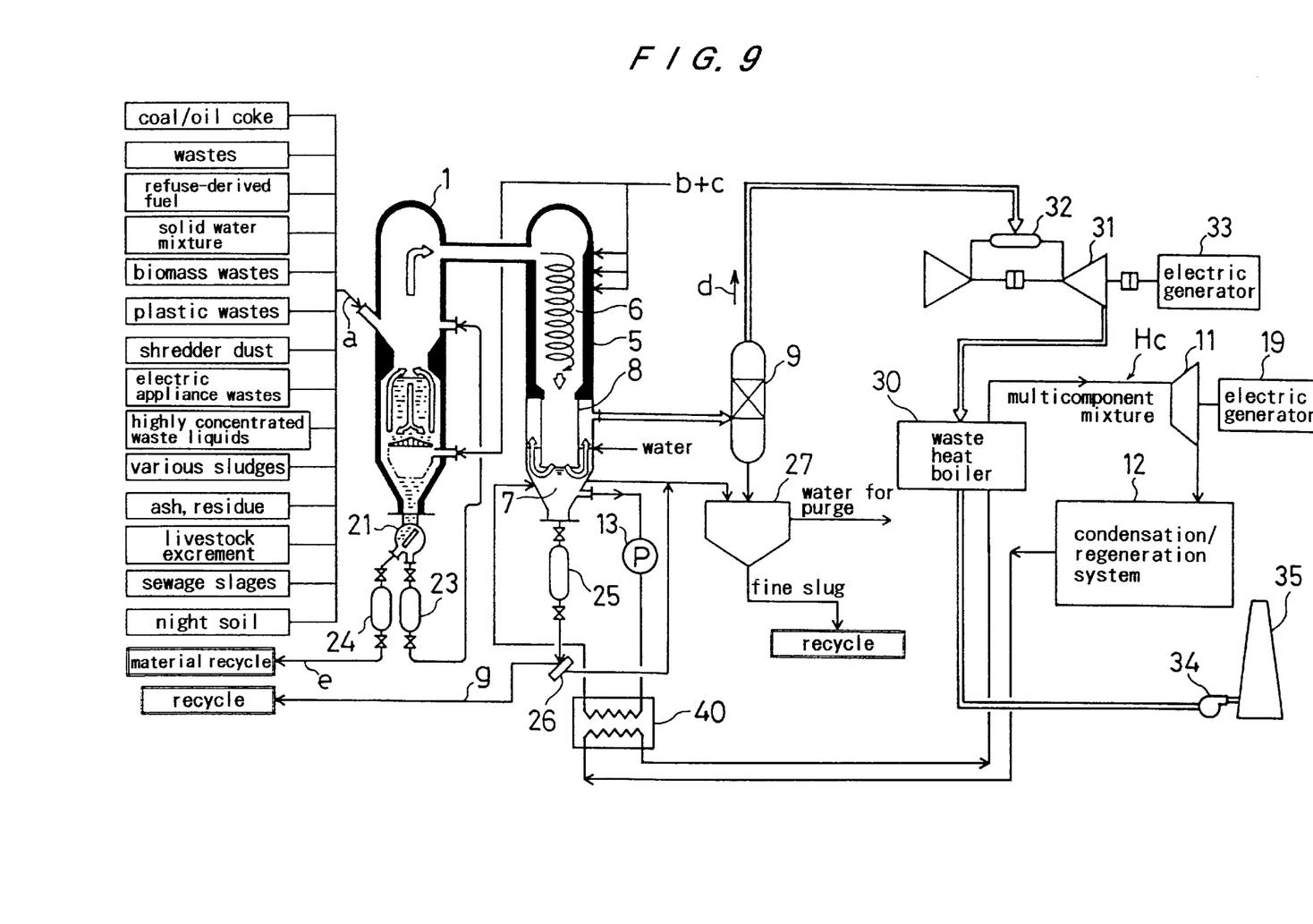
FIG. 9 is a schematic diagram of an energy recovery system for carrying out an energy recovery method according to a fourth embodiment of the present invention.

FIG. 9 shows an energy recovery system for carrying out an energy recovery method according to a fourth embodiment of the present invention. In the energy recovery system shown in FIG. 9, low-temperature waste heat produced when wastes are gasified is recovered by a heat exchanger 40 connected to the slag separation chamber 7 of the swirling-type melting furnace 5 and high-temperature waste heat from the gas turbine 31 is recovered by the waste heat boiler 30. Therefore, both the low-temperature waste heat and the high-temperature waste heat are recovered for more effective heat utilization. The multicomponent mixture in the heat cycle Hc is heated in the heat exchanger 40 by the quenching water from the slag separation chamber 7, and then further heated by the waste heat boiler 30. When the multicomponent mixture fluid is thus heated, it is turned into high-temperature steam that is supplied to the turbine 11 coupled to the electric generator 19.

In FIG. 9, the heat exchanger 40 may be replaced with the steam generator 10 provided in the slag separation chamber 7 of the melting furnace 5 to recover the low-temperature waste heat in the same manner as FIG. 1.

As is apparent from the above description, the present invention offers the following advantages:

1) Waste are gasified in the fluidized-bed gasification furnace at a relatively low temperature, the produced gaseous material and char are gasified in the melting furnace at a relatively high temperature, the produced gas is led to the heat exchanging unit to effect heat exchange, and heat generated by the heat exchange is recovered and delivered to the heat cycle to generate electric energy. Therefore, thermal energy retained by the gas produced in the gasification process can be effectively utilized to generate electric energy, and thus thermal efficiency of the overall system can be greatly improved.

2) Wastes are gasified in the fluidized-bed gasification furnace at a relatively low temperature, the produced gaseous material and char are gasified in the melting furnace at a relatively high temperature, the produced gas is introduced into a gas turbine and combusted therein to generate electric energy, and waste heat from the gas turbine is recovered and delivered to the heat cycle to generate electric energy. Therefore, the gas produced in the gasification process can be used directly as a fuel in the gas turbine to generate electric energy and waste heat from the gas turbine can be utilized to thus generate electric energy, and hence thermal efficiency of the overall system can be greatly improved.

3) By utilizing the heat cycle which uses a multicomponent mixture containing a component having a low boiling point as a working fluid, it is possible to effect heat recovery at a high efficiency from low-temperature waste heat from which heat recovery has not been effected by the conventional Rankin cycle or heat recovery has been effected at a low efficiency even if it is possible. Thus, thermal efficiency of the overall system can be greatly improved.

4) By allowing the gas produced in the gasifying process to pass through a quenching chamber provided at the lower part of the melting furnace, tar, char and corrosive material can be removed to thus obtain a clean purified gas. Thus, subsequent apparatus for purifying gas may be dispensed with. Since heat removed in the quenching chamber can be recovered and delivered to the heat cycle to generate electric energy, thermal energy retained by the produced gas can be utilized effectively, and thus thermal efficiency of the overall system can be greatly improved.

5) Since gasification of wastes can be accomplished at a high temperature range of 1300° C. or higher, harmful dioxins can be fully decomposed and ash content can be converted into harmless slag.

Although certain preferred embodiments of the present invention have been shown and described in detail, it should be understood that various changes and modifications may be made therein without departing from the scope of the appended claims.

What is claimed is:

1. A method for recovering energy from wastes, comprising:
   gasifying wastes in a fluidized-bed gasification furnace at a relatively low temperature;
   introducing gaseous material and char produced in said fluidized-bed gasification furnace into a melting furnace;
   gasifying the gaseous material and char in said melting furnace at a relatively high temperature;
   introducing gas produced in said melting furnace into a heat exchanging unit; and
   delivering heat recovered in said heat exchanging unit to a heat cycle to generate electric energy, said heat cycle comprising a heat cycle which uses a multicomponent mixture composed of at least two components having different boiling points.

2. A method according to claim 1, wherein at least one of said components has a boiling point lower than the boiling point of water.

3. A method according to claim 1, wherein said heat exchanging unit comprises one of a heat exchanger disposed in a slag separation chamber defined in said melting furnace and storing a cooling medium therein, a heat exchanger connected to said slag separation chamber and supplied with a cooling medium from said slag separation chamber, and a heat exchanger provided at a downstream side of said melting furnace for effecting heat exchange with the gas discharged from said melting furnace.

4. A method according to claim 3, wherein materials generated in said melting furnace are supplied in their entirety into said cooling medium in said slag separation chamber.

5. A method according to claim 3, wherein said cooling medium comprises water.

6. An apparatus for recovering energy from wastes, comprising:
   a fluidized-bed gasification furnace for gasifying wastes at a relatively low temperature to produce gaseous material and char;
   a melting furnace for producing gas from said gaseous material and said char at a relatively high temperature;
   a heat exchanging unit for recovering heat from said gas produced in said melting furnace; and
   a heat cycle for generating electric energy from said heat recovered by said heat exchanging unit, said heat cycle comprising a heat cycle which uses a multicomponent mixture composed of at least two components having different boiling points.

* * * * *